No. 804,984. PATENTED NOV. 21, 1905.
E. H. SEARLE.
RECOIL OPERATED FIREARM.
APPLICATION FILED NOV. 25, 1903.
6 SHEETS—SHEET 3.
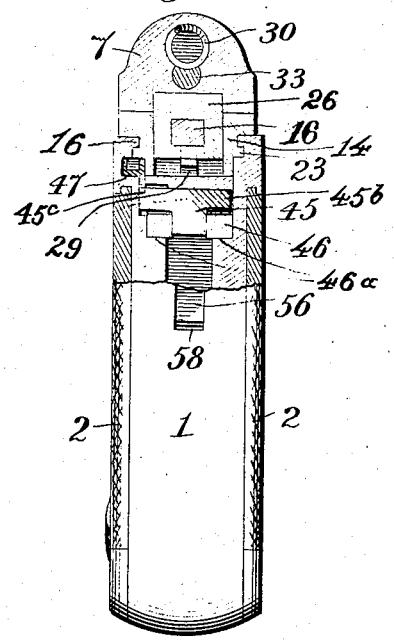
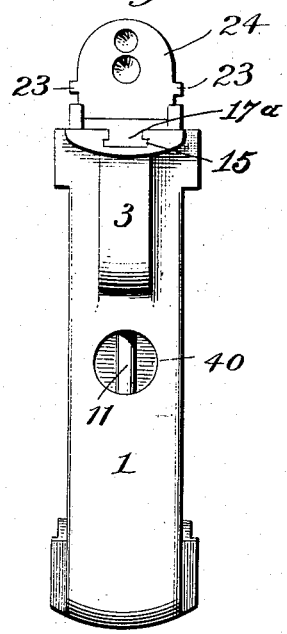
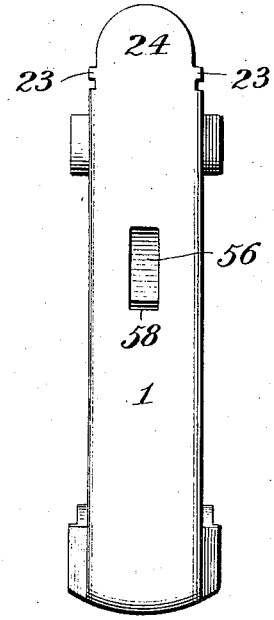
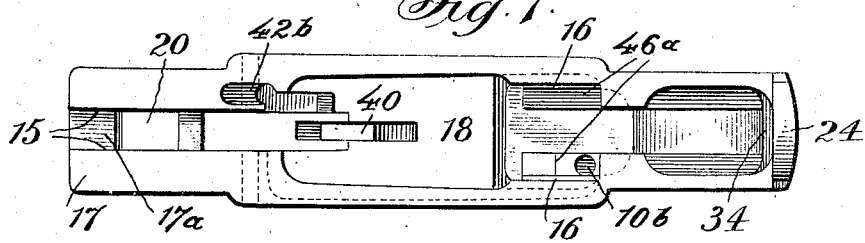
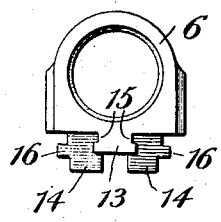
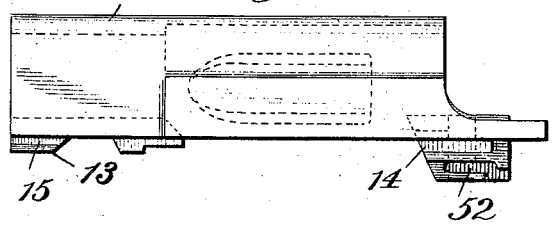
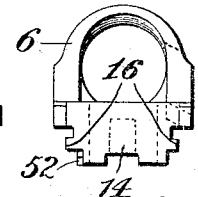

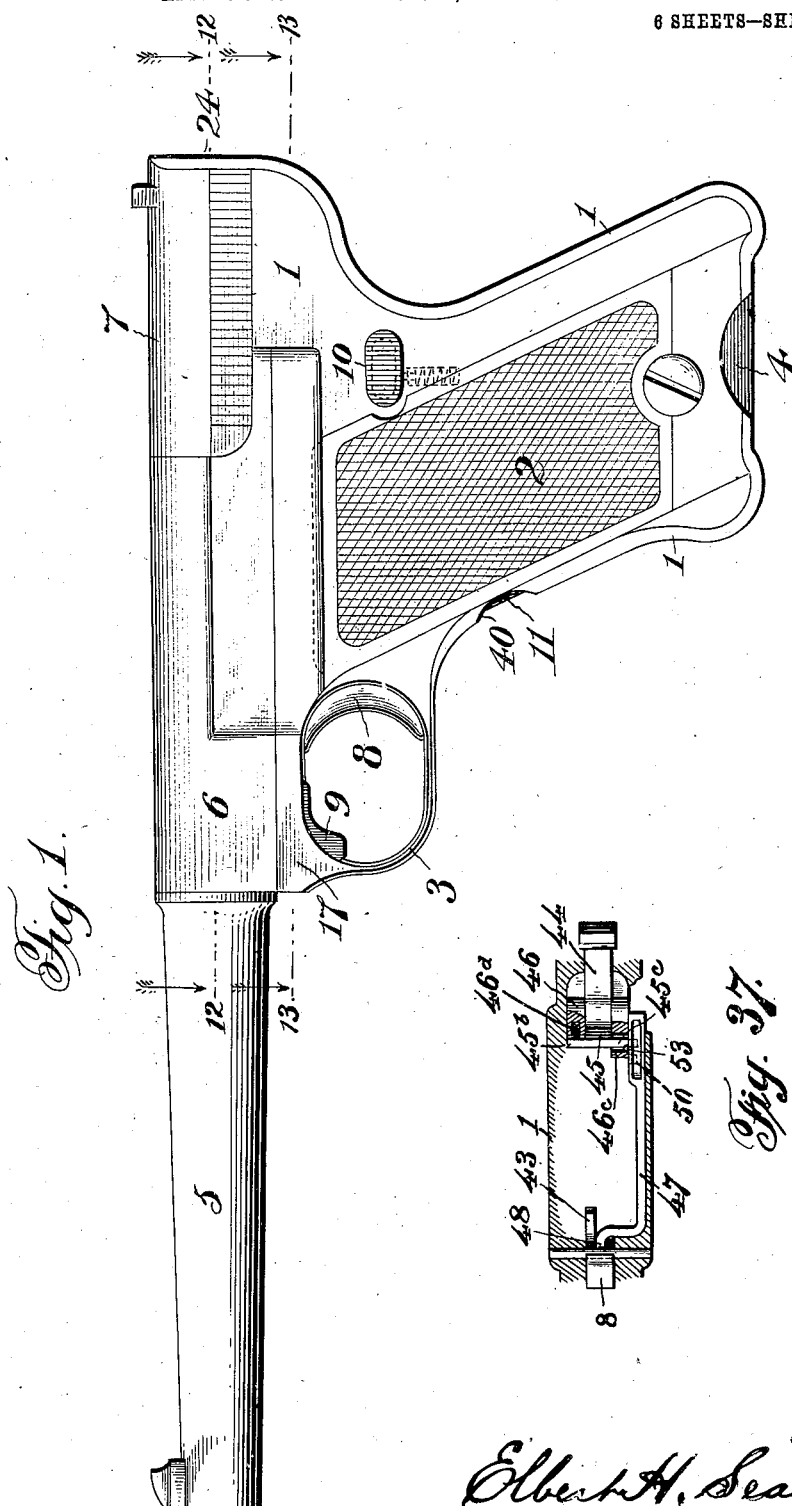

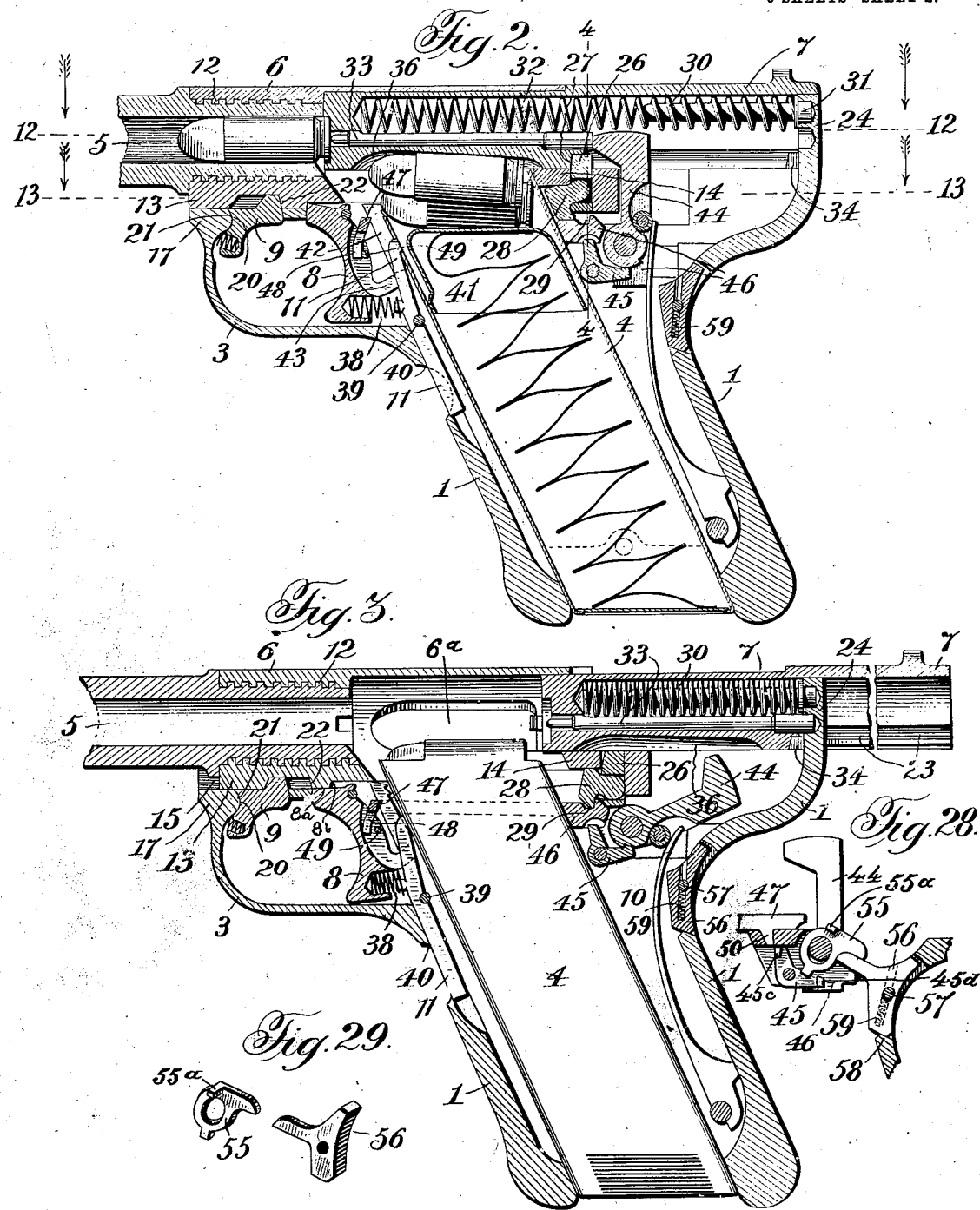

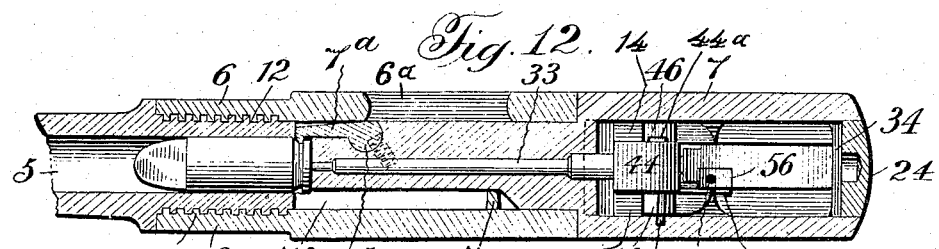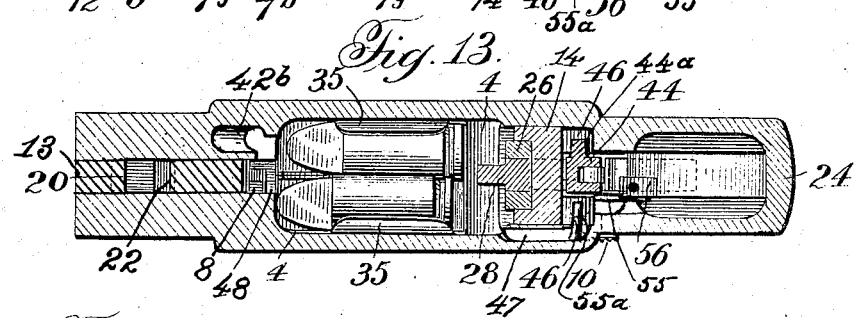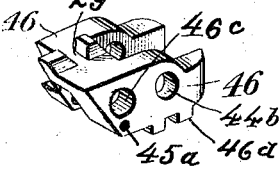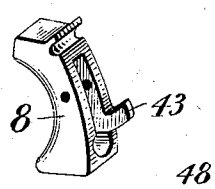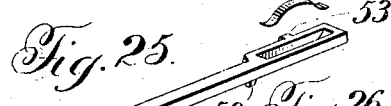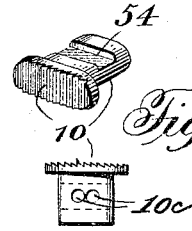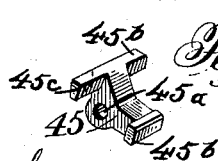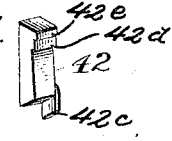

No. 804,984. PATENTED NOV. 21, 1905.
E. H. SEARLE.
RECOIL OPERATED FIREARM.
APPLICATION FILED NOV. 25, 1903.
6 SHEETS—SHEET 5.
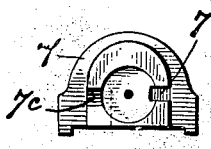
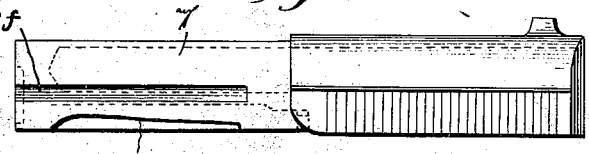
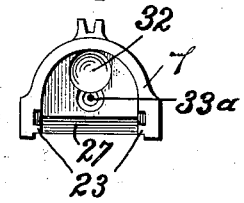
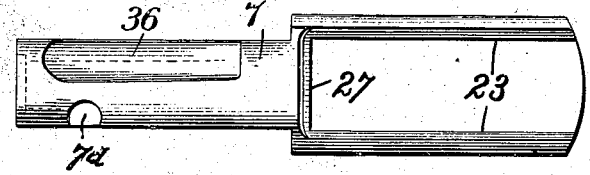
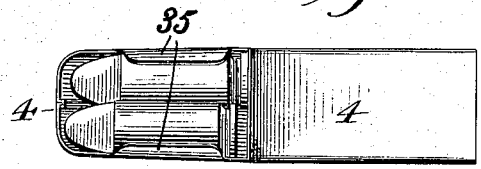
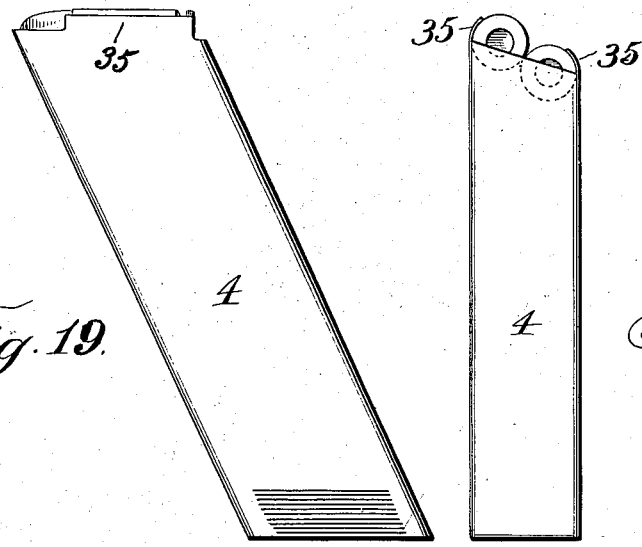
Witnesses:
Jas E Hutchinson
Inventor:
Elbert H. Searle,
By
Knight Bros
Attorneys No. 804,984. PATENTED NOV. 21, 1905.
E. H. SEARLE.
RECOIL OPERATED FIREARM.
APPLICATION FILED NOV. 25, 1903.

6 SHEETS—SHEET 6.

Witnesses:

Inventor
Elbert H. Searle
By
Knight Bros
Attorneys

UNITED STATES PATENT OFFICE.

ELBERT H. SEARLE, OF PHILADELPHIA, PENNSYLVANIA, ASSIGNOR OF THREE-FOURTHS TO WILLIAM D. CONDIT, OF DES MOINES, IOWA.

RECOIL-OPERATED FIREARM.

No. 804,984.     Specification of Letters Patent.     Patented Nov. 21, 1905.

Application filed November 25, 1903. Serial No. 182,659.

*To all whom it may concern:*

Be it known that I, ELBERT H. SEARLE, of Philadelphia, in the State of Pennsylvania, have invented certain new and useful Improvements in Recoil-Operated Firearms, of which the following is a specification.

My invention relates to magazine-firearms automatically operating under the action of the recoil to open the breech, eject the spent shell, and cock the firing-hammer, and under the action of a return-spring to close the breech and cause the breech-bolt to insert a new cartridge, the gun being rendered at will semi-automatic, requiring a pull of the trigger for each shot or full automatic firing continuously while the trigger is held.

My invention consists in certain features of novelty in the assembling of the arm and in the relation and construction of its various parts, all of which will be hereinafter fully described, and particularly pointed out in the claims.

Figure 31:
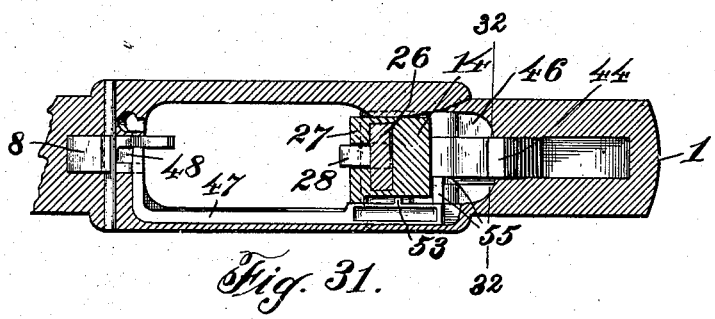
Figures 32, 36:
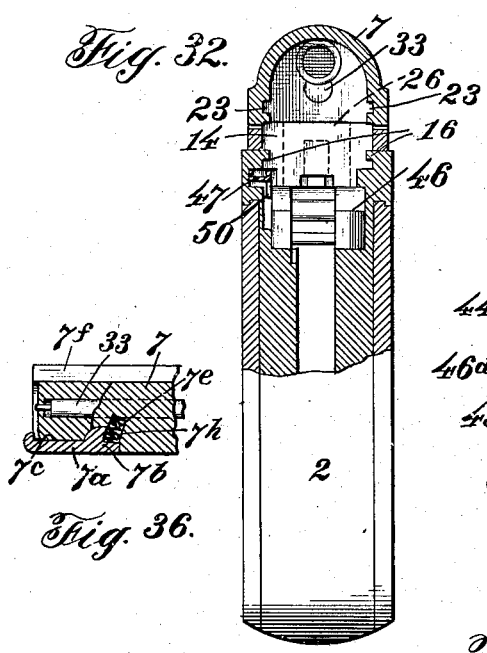
Figures 30, 33:
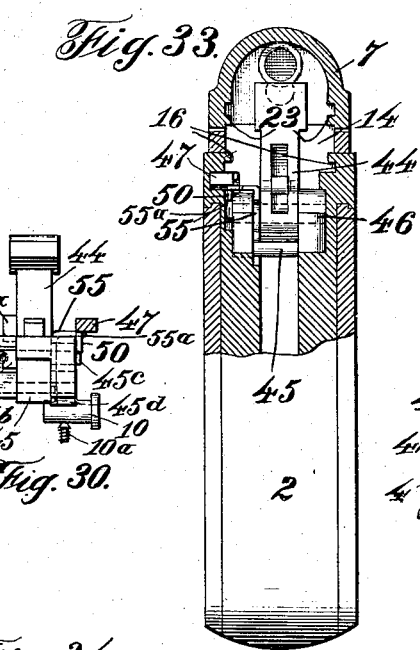
Figure 35:
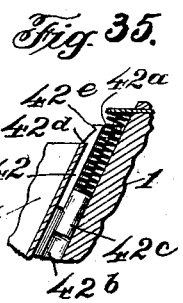
Figure 34:
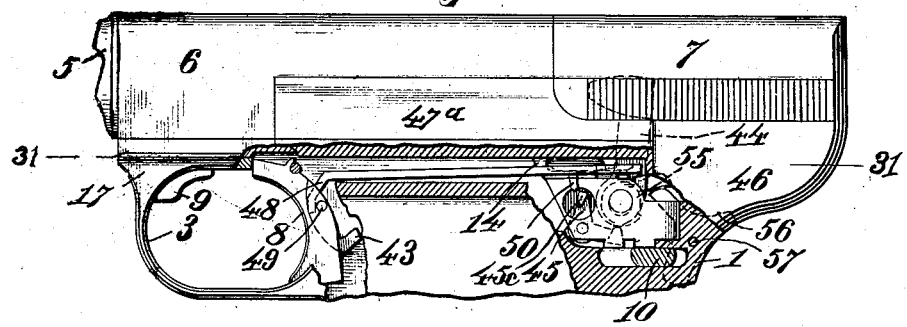

In the accompanying drawings, which for purposes of illustration show the features of my invention applied to a pistol, Figure 1 is a side elevation of a complete firearm. Fig. 2 is a vertical longitudinal section of the same with the barrel broken away, the parts being in firing position. Fig. 3 is a view similar to Fig. 2, showing the parts in loading position. Fig. 4 is a vertical transverse section on the line 4 4, Fig. 2. Figs. 5 and 6 are front and rear views of the frame with the barrel, the receiver, and the breech-bolt removed. Fig. 7 is a plan view of the frame. Figs. 8, 9, and 10 show side and end views of the receiver without the barrel which it carries. Fig. 11 is a plan view of the arm. Figs. 12 and 13 are horizontal sections of the arm, taken, respectively, on the lines 12 12 and 13 13 of Figs. 1 and 2. Figs. 14, 15, 16, and 17 show the breech-bolt in side elevation, bottom plan, and front and rear elevation. Figs. 18, 19, and 20 show the magazine-case in plan view, side view, and rear end view. Fig. 21 is a perspective view of the action-case. Fig. 22 is a perspective view of the hammer. Fig. 23 is a perspective view of the trigger. Fig. 24 is a perspective view of the sear. Fig. 25 is a view of the rod through which the trigger controls the sear and the spring for depressing the rear end of said rod. Fig. 26 represents in perspective, top view, and two side views the trigger-locking device. Fig. 27 represents the safety-slide. Figs. 28 and 29 are detail views showing the means for rendering the firearm fully automatic. Fig. 30 is a front view of the action-case with parts mounted therein. Fig. 31 is a section on the line 31 31, Fig. 34. Fig. 32 is a section on the line 32 32, showing the parts carried by the action-case removed. Fig. 33 is a like view showing the parts in position. Fig. 34 is a view of a portion of the firearm with the front wall removed. Fig. 35 is a detail view of the trigger-locking dog. Fig. 36 is a detail view of the extractor. Fig. 37 is a sectional view of the gun, showing the firing mechanism.

Referring to Fig. 1, 1 represents the frame, formed with a grip 2 and trigger-guard 3 and having inserted within the grip a magazine-case 4. The barrel 5 is carried by a receiver 6, which is suitably mounted upon the frame 1 and provided with a breech-bolt 7, which slides with the receiver as the latter recoils and thereafter moves independently of the receiver under its own inertia.

8 represents the trigger, having a nose $8^a$, which engages behind a shoulder $8^b$ on the receiver and dogs the receiver to prevent the latter's movement until the trigger is pulled. This pistol is cocked, as will hereinafter appear, by the rearward movement of the barrel and receiver, and therefore if the muzzle of the barrel should receive an accidental blow by the falling of the pistol or otherwise the pistol would become cocked and produce a premature discharge. The nose $8^a$, however, prevents this by holding the barrel against movement until the trigger is pulled. 9 is a releasable detent which holds the receiver on the frame, 10 a safety-slide, and 11 a magazine-releasing device, all of which will be more fully described hereinafter.

Assembling the firearm is accomplished without the use of screws, the parts being made to fit securely yet removably in their several places in such a manner that commencing with the barrel with its receiver and breech-bolt the parts may be removed successively and thereafter replaced in reverse order to that in which they are removed. The barrel 5 is threaded at 12 in its receiver 6, and this receiver is fitted to the frame by a front projection 13 and rear projections 14, which have tongue-and-groove connections 15 16, respectively, with the walls of a guideway $17^a$ on the extension 17 and the sides of the action-recess of the frame. In this manner the receiver is connected at its front and rear ends with the frame; but a slight forward movement beyond its normal position will bring the rear connections 16 into the magazine-recess 18, (see Fig 17,) while the front connections 15 will move beyond the extension 17, and the receiver with its barrel and breech-bolt are free to be removed. To prevent the receiver moving to its releasing position, the spring-pressed detent 9 is fitted in an opening 20 in the extension 17, being provided with a fulcrum 21 at the forward end of said opening 20 and so fitting the rear end of said opening that the detent will be prevented from moving downward further than to release the receiver, which it engages through a shoulder 22. Its lower end projects within the trigger-guard to permit the detent to be rocked on its fulcrum to release the receiver. When the receiver is released and removed from the frame, the detent 9 may also be removed upward through the opening 20.

The breech-bolt 7 is fitted in and guided by the receiver 6 at its reduced forward end, as shown in Fig. 12, and at its rear end by tongue-and-groove connections 23 with the spring-abutment 24 at the rear end of the frame. The rear shell of the breech-bolt works over the abutment 24 during the action of the arm. The forward movement of the receiver necessary to release it from its tongue-and-groove connections also releases the tongue-and-groove connections at the rear end of the breech-bolt. The breech-bolt is locked to the receiver during the first part of the latter's recoil movement by a locking-bolt 26, working in the projection 14 and engaging behind a shoulder 27 on the breech-bolt. A rocker 28 also in the projection 14 engages the bolt 26 and during the rearward movement of the receiver enters a depression 29 on the hereinafter-described action-case and causes the rocker to withdraw the bolt 26. This permits the breech-bolt to continue its rearward movement independently of the receiver, so as to open the breech, as shown in Fig. 3, and withdraw the spent shell, for which purpose the breech-bolt is provided with an extractor $7^a$, Fig. 12, seated in a recess $7^c$ and pivoted through means of a cylindrical boss $7^b$, bearing in a cylindrical seat $7^d$ in the side of the breech-bolt, engaging more than a semicircumference of the boss, while the receiver has a laterally and downwardly presented discharge-opening $6^a$. The extractor is held in its seat by a spring $7^e$, mounted in a socket $7^h$ in the bolt 7, and by the upper and lower walls of the receiver, and can therefore be readily removed by swinging it outward and moving it downward, or replaced when the breech-bolt and receiver are separated. A pathway or slot $7^f$ is also provided in the side of the bolt 7 to permit the bolt to move over the ejector-post $7^g$. To return the breech-bolt and force in a new cartridge, I provide a spring 30, supported at its rear end by a post 31 against the spring-abutment 24 and having its forward end fitted in a bore 32 in the breech-bolt. This spring forces the breech-bolt back into the receiver and thereafter returns the receiver to firing position.

33 represents the firing-pin, whose bore $33^a$ in the breech-bolt intersects that of the spring 30, so that the spring may engage behind the head of the firing-pin and retain it in position. Upon removing the receiver and breech-bolt the spring is withdrawn and the firing-pin may be removed and replaced. By the forward movement of the receiver the rocker 28 returns the bolt 26 to its position behind the shoulder 27, and these parts 26 27 being made wedging a tight closure of the breech is effected. The breech-bolt is arrested in its rearward movement by a stop 34, which receives the shoulder 27. This stop being at the base of the abutment 24 affords a solid and unyielding limit for movement of the breech-bolt.

The magazine-case 4 contains a double row of cartridges and has retaining-lips 35 at its upper end to prevent escape of cartridges except as they are forced forward by the successive closing movements of the breech-bolt. The breech-bolt is provided with a recess 36 in its under side of a size to permit the uppermost cartridge to project therein when the bolt is in a closed position. This is a very important feature for the reason that a cavalryman, who is deprived of the use of one of his hands owing to having hold of the bridle, cannot with ease insert a magazine that requires the compression of a spring which is already under great compression. By this improvement the uppermost cartridge enters the recess 36 without depressing the cartridges or compressing the magazine-spring, thereby overcoming the objection above mentioned, the cartridges being depressed when the breech-bolt moves rearwardly. This case is retained in the pistol-grip by detent 11, pressed into engagement therewith by a spring 38, which also presses outward on the trigger 8, said detent being fulcrumed at 39 and having its free end presented in an opening 40 to receive the finger when it is desired to release the magazine-case. The magazine-case carries a follower 41, which when it reaches its upper limit displaces a trigger-locking dog 42 and permits the latter to move downward behind a horn 43 on the trigger 8 under the action of the spring $42^a$, which is mounted within recess $42^b$ in the frame and bears against a cylindrical projection $42^c$ on the dog, also mounted within recess $42^b$. This prevents pressing the trigger to fire the last cartridge, and hence there is always a cartridge left in the barrel-chamber to automatically operate the gun after a freshly-loaded magazine-case is inserted. As shown in Fig. 26, the locking-dog 42 has a plurality of notches at its upper end. The lower one, 42$^d$, of these notches is engaged by the edge of the magazine-case when the latter is inserted, which moves the dog upward out of engagement with the horn on the trigger. When the dog is released by the follower reaching its upper limit, it drops and catches upon the upper notch 42$^e$, which still retains the engagement of the dog with the case. The user of the arm being notified by the locking of the trigger that the cartridges are exhausted from the magazine-case presses the detent 11 and releases the magazine-case. The dog 42 thereupon moves the magazine downward under the action of the spring 42$^a$ of said dog, so that the magazine can readily be withdrawn. The dog 42 acting on the magazine-case causes the ejection of the same when magazine-release 11 is operated. The user having been previously notified by the trigger-lock that the magazine is empty places a hand in position to catch the magazine when it is ejected, thereby preventing it being thrown to the ground and saving the same for future use.

An action-case 46 rests upon seats 46$^a$ on opposite sides of the frame in the rear of the magazine. This action-case is bifurcated at its rear and its under side. In the rear bifurcation is pivoted at 44$^b$ the hammer 44, provided with a lateral projection 44$^a$ in the path of the projection 14 of the receiver, so that upon the rearward movement of the receiver the hammer is cocked. In the bifurcation on the under side of the action-case is pivoted at 45$^a$ the sear 45, which engages at its rear end in the notch 44$^c$ on the hammer and is provided with an arm 45$^b$, fitting in a recess 46$^b$ in one wall of the bifurcation and an arm 45$^c$, extending through an opening 46$^e$ in the opposite wall of the bifurcation. A spring 46$^d$, Fig. 30, seated in the action-case 46 and bearing against the rear of arm 45$^b$ of the sear, causes the rear end of the sear to have a tendency to enter the notch 44$^c$ of the hammer.

Connection between the trigger 8 and the sear 45 is established through the medium of a rod 47, whose forward end 48 engages between a pin 49 and the rear face of the trigger, while the rear end of said rod carries a depending projection 50, which engages the arm 45$^c$ of the sear 45. The rod 47 lies in a recess 47$^a$ along the left face of the frame-cavity and has a slight vertical play therein. It is forced normally downward by a spring 51 between the rod and the top of the recess in which it works; but by compressing spring 51 it may rise upward in its recess a sufficient distance to disengage it from the arm 45$^c$ of the sear. This disengagement becomes necessary in semi-automatic firing in order to permit the sear to instantly reëngage with the hammer after firing and at the end of recoil, it being impossible for the user to release the trigger with sufficient promptness for this purpose. To lift the rod 47 out of engagement with the sear, the receiver 6 is provided with a groove 52 on its projection 14, as shown in Fig. 8, which engages a projection 53 on the rod. Groove 52 is so shaped that it raises and holds the rod out of engagement with the sear during recoil and until the receiver has returned to firing position, thereby giving it vertical transverse movements.

The safety-slide 10 will be understood upon reference to Figs. 1, 27, and 35. It has a groove 54, which is engaged by a depending portion 46$^d$ on the action-case 46 to prevent withdrawal of the slide when the action-case is in place, while permitting it to move backward and forward on the face of the grip, it being held in these two positions by a spring-pressed plunger 10$^a$, mounted in socket 10$^b$ and entering notches 10$^c$ on the under side of said slide. When in its forward position, the slide 10 engages directly beneath the sear 45 and prevents the latter being moved to release the hammer. If the hammer is released and the sear depressed by the boss of the hammer, the slide 10 will be arrested by the sear. By this means the position of the hammer can be ascertained at any time.

Full automatic action of the arm is attained by providing the attachments shown in Figs. 28, 30, and 34, wherein 55 represents a tripping-fly mounted on the hammer-trunnion with transverse play and 56 a lever fulcrumed at 57 with slight play, which permits it to be pushed in or up over a projection 58. It is held in either position by a spring 59. When pressed inward, it moves the fly 55 into a position to engage a projection 45$^d$ on the sear 45 and to have its arm 55$^a$ engaged by the rod 47. As has already been seen, the shape of the groove 52 in the receiver is such that as the receiver reaches firing position the wall of the groove will depress the rod 47. Hence when the lever 56 is rocked inward on its pivot 57 it will move the fly 55 in such position that each time the receiver returns to firing position the rod 47 will depress fly 55 and automatically release the sear. The arm thus continues firing, but only so long as the trigger is pressed, since the release of the trigger will move the rod 47 forward out of position to engage the fly.

Having thus described my invention, the following is what I claim as new therein and desire to secure by Letters Patent:

1. In a firearm, the combination of a frame, a barrel sliding longitudinally into engagement therewith and a pivoted detent securing the barrel against detachment; said pivoted detent being located on the frame and projecting into the trigger-guard, and having a spring pressing it into engagement with the barrel.

2. In a firearm, the combination of a frame, a barrel slidably mounted on said frame by means of a tongue-and-groove joint, and a pivotal detent inserted downwardly into a vertical opening in the frame beneath the barrel, fulcrumed against one end of the opening, engaging the barrel by an upwardly-presented end, and having an end beneath its fulcrum projecting into the trigger-guard to permit releasing the detent.

3. In a recoil-operated firearm, the combination of the frame, the barrel having a receiver slidably mounted upon the frame by a tongue-and-groove joint, and a pivotal detent limiting the forward movement of the barrel, fulcrumed on the frame, projecting into a recess in the receiver, and having an end projecting into the trigger-guard by which to release the detent.

4. In a firearm, the combination of the frame, a barrel movable longitudinally on the frame into and out of engagement therewith, and a releasable detent for securing the barrel on the frame, fitted beneath the barrel in a vertical recess in said frame, and removable vertically therefrom when the barrel is removed.

5. In a firearm, the combination of a frame, having a magazine-opening and a receiver constructed with front and rear projections having tongue-and-groove connections with the frame in front and rear of the magazine-opening; said receiver being releasable by moving it forward until the rear projection enters the magazine-opening.

6. In a firearm, a frame having an opening therein, and a receiver slidingly connected with the frame by means of tongue-and-groove connections in front and rear of said opening and releasable by moving the receiver until its connecting parts in rear of the frame-opening enter said opening.

7. In a firearm, the combination of the frame, the breech-bolt reciprocating on the frame, the firing-pin movable to and from the breech of the barrel with the breech-bolt, and the return-spring; said firing-pin and return-spring being contained in intersecting bores in the breech-bolt whereby the spring holds the pin in place.

8. In a firearm, the combination with the barrel and the reciprocating breech-bolt movable to and from the breech of the barrel, of a firing-pin carried by the breech-bolt to and from the barrel, and a return-spring arranged in a bore in the breech-bolt parallel with the firing-pin and engaging the same on its side to retain it in the bolt.

9. In a magazine-firearm, the combination of a removable cartridge-case provided with a spring for elevating the cartridges, and a breech-bolt having a recess in its under side of a size sufficient to permit the uppermost cartridge to project therein when the breech-bolt is in a closed position and permitting the insertion of the case without substantially depressing the cartridges and further compressing the spring, whereby the insertion of the case is facilitated when the operator is deprived of the free use of his hands.

10. In a recoil-actuated firearm, the combination of the frame, the reciprocating receiver, the breech-bolt sliding in the receiver, and means for locking and unlocking the breech-bolt in the receiver, consisting of the wedging locking-bolt sliding vertically in the receiver and engaging a beveled shoulder on the breech-bolt, a loosely-fulcrumed rocker mounted in the receiver moving with the same and engaging the locking-bolt, and means engaging the rocker as the receiver moves backward and forward to move the sliding locking-bolt to unlock and lock the breech-bolt.

11. In a gun, the combination of the removable magazine-case, a follower, a trigger, a trigger-locking device engaging said case and adapted to be released by the follower, and means for throwing the same into a position to lock the trigger when so released, said magazine-case when inserted, adapted to move said locking device out of locking position, substantially as described.

12. In a magazine-gun, the combination of the trigger, a trigger-locking device normally holding the trigger against movement, means operated upon the charging of the gun for operating the locking device to permit the trigger to be moved, and means automatically causing the locking device to lock the trigger against movement as soon as the magazine becomes empty.

13. In a gun, the combination with the removable cartridge-case, the follower for the same, and the trigger, of a locking device normally holding the trigger against movement, moved out of engagement with the trigger by the cartridge-case when inserted, and means automatically moving the locking device into engagement with the trigger and controlled by the follower.

14. In a gun, the combination with a removable cartridge-case, and a manually-operated releasable detent for the same, of spring-pressed means locking the trigger acting on the cartridge-case and imparting movement to the same when the detent is released.

15. In a magazine-gun, the combination with the spring-ejected magazine-case and the trigger, of a trigger-lock operating before the case is ejected, means causing the trigger to be locked when the magazine becomes empty, and a manually-operated magazine-release.

16. In a magazine-gun, the combination with the magazine-case and the trigger, of a spring-pressed trigger-lock acting on the magazine to eject the case when said case is released, means causing the trigger-lock to lock the trigger when the magazine becomes empty, and means for releasing the magazine-case.

17. In a gun, the combination of the trigger, a spring-pressed device normally tending to lock the trigger, a magazine-case engaging the spring-pressed device when inserted, to release the trigger and a follower engaging the spring-pressed device when the magazine is empty to cause the device to lock the trigger and yet remain in engagement with the magazine-case to eject the magazine-case.

18. In a firearm, the combination of a frame, an action-case suitably mounted in the frame, a hammer mounted in said action-case, a sear coöperating with said hammer, projections on opposite sides of said sear, a setting-spring coöperating with one of said projections, a push-rod coöperating with the other of said projections, and a trigger controlling said push-rod.

19. In a recoil-operated firearm, the combination of the reciprocating-receiver, the hammer, the sear for retaining the hammer, the push-rod for releasing the sear and a trigger controlling the push-rod; said push-rod having a projection working in a guide in the receiver, said guide being constructed to move the push-rod out of engagement with the sear by the inward movement of the receiver so that the hammer may be engaged by the sear during the automatic operation of the arm.

20. In a gun, the combination with the breech-bolt and the receiver movable together and also relatively to one another, of a firing-hammer, the sear, the trigger, a connection between the trigger and the sear, and means carried by the receiver automatically breaking the said connection on the movement in one direction of the receiver and the breech-bolt together.

21. In a gun, the combination with the breech-bolt and the receiver movable together and also relatively to one another, of a firing hammer, the sear, the trigger, a connection between the trigger and the sear, and means carried by the receiver automatically breaking the said connection on the movement in one direction of the receiver and the breech-bolt together, and automatically making the said connection on the movement in the other direction of the receiver and the breech-bolt together.

22. In a gun, the combination with the breech-bolt, and the receiver movable together and also relatively to one another by the force of the explosion, of a firing-hammer, the trigger, a sear, a rod connecting the sear and the trigger to operate the former from the latter for releasing the firing-hammer, a guide on the receiver formed to move the rod to one position to break the connection between the trigger and the sear in one direction of movement of the receiver, and to move the rod to another position to make the connection between the trigger and the sear in the other direction of movement of the receiver.

23. In a gun, the combination with the receiver movable automatically upon firing to permit a cartridge to be fed to the barrel, of dogging means holding the receiver against movement, and a trigger connected to the dogging means to move said means out of the dogging engagement with the receiver when pulled.

24. In a recoil-operated firearm, the combination of the frame, the barrel and receiver recoiling on the frame, and a firing-trigger having a projection normally engaging the recoiling-post and dogging its recoil movement except when the trigger is pulled.

25. In a recoil-operated firearm, the combination of the frame, the barrel and receiver recoiling on the frame and a trigger for firing the arm having a projection extending forward and upward and normally in engagement with a shoulder on the receiver to prevent recoil of the barrel except when the trigger is intentionally pulled.

26. In a firearm, the combination of the frame, the barrel movably connected to the frame and a trigger fitted in the opening in the frame engaging a suitable fulcrum on one side of said opening and abutting the other side of said opening to prevent displacement of the trigger; said trigger being removable by swinging it upward when the barrel is removed.

27. In an automatic firearm, the combination of the hammer, the sear for holding the hammer and the trigger, a rod through which the trigger controls the sear, releasing means movable into a position to engage the sear, a part moving automatically in the operation of the gun provided with a cam-groove adapted to hold the rod out of engagement with the sear during the first portion of the movement of said part and to move the rod into engagement with the releasing means to release the hammer at the end of the movement of said part.

28. In an automatic firearm, the combination with the hammer, the sear controlling the hammer and the trigger for controlling the sear; a releasing-fly movable into and out of position to control the sear, and adapted to be operated by the automatic action of the firearm, and a lever controlling the position of said releasing-fly at will.

29. In an automatic firearm the combination of the hammer, the sear for controlling said hammer, the trigger, the rod through which the trigger controls the sear, connection between said rod and an automatically-reciprocating part of the arm which imparts transverse movements to the rod, a releasing-fly movable into and out of position to engage the sear and to be engaged by the rod, and a setting-lever through which the releasing-fly may be moved in and out of its effective position at will.

30. In a firearm, the combination of the frame, the hammer, the sear, and the safety-slide movable into direct engagement with the sear when the latter is engaging the hammer, and preventing the release of the sear when in such position, but abutting against the sear when the latter is in release position; said hammer and sear being mounted in an action-case, and said safety-slide having a recess in which the action-case enters to retain the safety-slide in the frame.

31. In combination with the breech-bolt of a firearm, an extractor with a cylindrical boss fitting in a cylindrical seat in said breech-bolt and having an eccentric face on said boss, and a spring seated between the bolt and said eccentric face, and throwing the free end of the extractor into engagement with the shell.

32. In combination with the breech-bolt of a firearm, an extractor constructed with a cylindrical boss, fitting a cylindrical bearing in the breech-bolt which surrounds more than half the circumference of the boss whereby the bearing embraces the boss to hold the extractor in place; said boss having a flat outer face which releases the boss from its bearing when the extractor is turned outwardly to bring said outer face within the bearing; and a spring for holding the extractor in operative position.

33. In combination with the breech-bolt of a firearm, an extractor constructed with a cylindrical boss, fitting a cylindrical bearing in the breech-bolt which surrounds more than half the circumference of the boss whereby the bearing embraces the boss to hold the extractor in place; said boss having a flat outer face which releases the boss from its bearing when the extractor is turned outwardly to bring said outer face within the bearing, a spring for holding the extractor in operative position, and an eccentric face on the portion of the boss within the bearing to receive said spring.

34. In a gun, the combination with recoiling part, the firing-hammer, the sear, the trigger, and a connection between the sear and the trigger moved by the recoiling part to break the connection, of means adapted to be inserted between the trigger and sear connection and the sear, and operated by the said connection to operate the sear on every return of the parts of the gun to firing position while the trigger is held.

35. In a gun, the combination with the firing-hammer, the sear, the trigger, and a connection between the trigger and the sear, of a breech-bolt, and a recoiling receiver movable to permit the locking and unlocking of the breech-bolt and adapted to move said connection to operate the sear every time the parts of the gun return to firing position while the trigger is held.

36. The combination with a trigger, of a trigger-lock, a spring moving the trigger-lock into engagement with the trigger, and a magazine-follower controlling the trigger-lock.

37. The combination with a trigger, of an independent trigger-lock, a magazine-follower independent of the lock controlling the locking action of said lock.

38. The combination with a trigger, of a spring-pressed trigger-lock, means for holding the same out of locking relation with the trigger and a magazine-follower releasing said trigger-lock to cause its locking action.

The foregoing specification signed this 13th day of November, 1903.

ELBERT H. SEARLE.

In presence of—
FRANCIS S. LAWS,
W. D. CONDIT.